(12) United States Patent
Chen et al.

(10) Patent No.: US 11,874,651 B2
(45) Date of Patent: Jan. 16, 2024

(54) PEER-TO-PEER INTERACTION MANAGEMENT SYSTEM FOR AUTONOMOUS MOBILE ROBOTS FOR OPTIMIZING FLEXIBLE MANUFACTURING

(71) Applicant: FAROBOT INC., New Taipei (TW)

(72) Inventors: Chia-Pang Chen, New Taipei (TW); Eduardo Munera Sanchez, Madrid (ES)

(73) Assignee: FAROBOT INC., New Taipei (TW)

( * ) Notice: Subject to any disclaimer, the term of this patent is extended or adjusted under 35 U.S.C. 154(b) by 51 days.

(21) Appl. No.: 17/350,241

(22) Filed: Jun. 17, 2021

(65) Prior Publication Data
US 2022/0276645 A1   Sep. 1, 2022

Related U.S. Application Data
(60) Provisional application No. 63/154,297, filed on Feb. 26, 2021.

(51) Int. Cl.
*G05B 19/418*   (2006.01)

(52) U.S. Cl.
CPC ... *G05B 19/41895* (2013.01); *G05B 19/4183* (2013.01); *G05B 19/4185* (2013.01)

(58) Field of Classification Search
None
See application file for complete search history.

(56) References Cited

FOREIGN PATENT DOCUMENTS

CN   111885550   11/2020

OTHER PUBLICATIONS

Yang, Qin, et al. "Self-reactive planning of multi-robots with dynamic task assignments." 2019 International Symposium on Multi-Robot and Multi-Agent Systems (MRS). IEEE, 2019. (Year: 2019).*

* cited by examiner

*Primary Examiner* — Carlos R Ortiz Rodriguez
(74) *Attorney, Agent, or Firm* — ScienBiziP, P.C.

(57) ABSTRACT

A peer-to-peer interaction management system for optimizing flexible manufacturing comprising a plurality of peers and comprises rules for defining the data interaction, operational interaction, environmental interaction and safety interaction. The plurality of peers comprising a robot control server and a plurality of autonomous mobile robots. One peer can exchange data with another peer, the data can comprise planning data, operational data, monitor data, and safety data.

18 Claims, 6 Drawing Sheets

PEER-TO-PEER INTERACTION MANAGEMENT SYSTEM FOR AUTONOMOUS MOBILE ROBOTS FOR OPTIMIZING FLEXIBLE MANUFACTURING

RELATED APPLICATION

This application claims priority to U.S. Provisional Patent Application No. 63/154,297 entitled MULTI AGENT PEER-TO-PEER INTERACTION METHODS FOR FLEXIBLE MANUFACTURING OPTIMIZATION filed Feb. 26, 2021 which is incorporated herein by reference for all purposes.

TECHNICAL FIELD

The subject matter herein generally relates to communications management.

BACKGROUND

Existing works often require a centralized server or an intermediary to realize an interaction among multiple devices (like robots). As a result, peers in a fleet becomes unable to operate autonomously. Distributed consensus defines a sequence of actions that are agreed by the peers involved in a voting system. Every peer needs to be aware of a sequence, but this reduces flexibility and independence of operation and has little reconfiguration capabilities. A comprehensive approach including tasks, robots, and behavior execution is required.

Thus, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
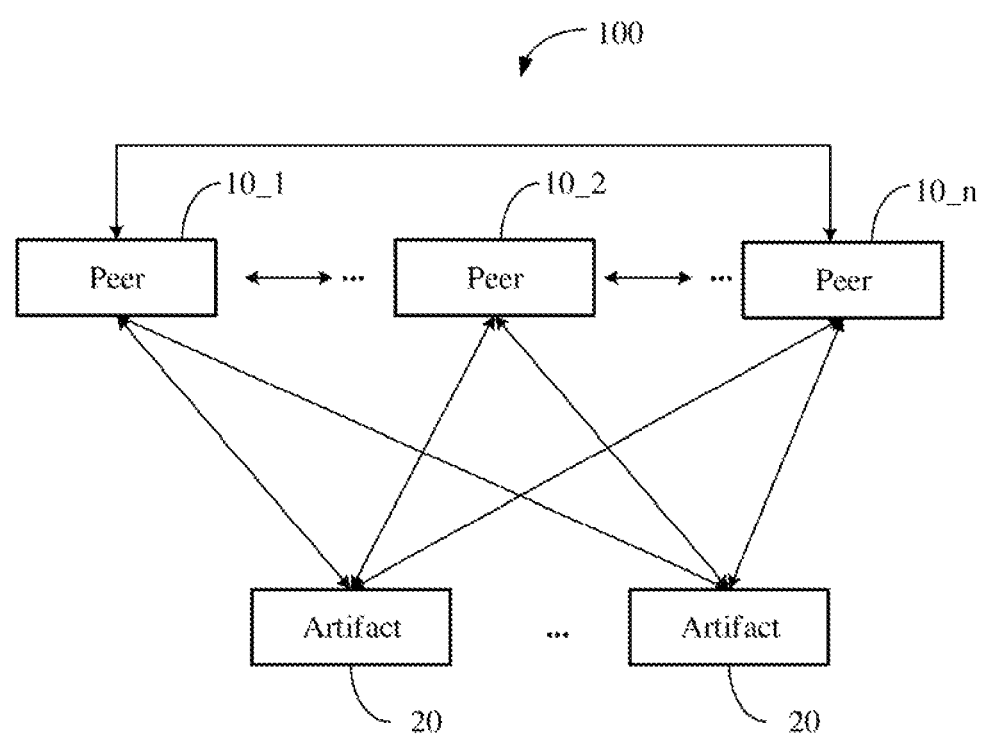
FIG. 1 is a block diagram of an embodiment of a system enabling peer-to-peer and peer-to-artifact interaction.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

The term "comprising," when utilized, means "including, but not necessarily limited to"; it specifically indicates open-ended inclusion or membership in the so-described combination, group, series, and the like.

FIG. 1 illustrates an embodiment of a peer-to-peer interaction system 100 for optimizing flexible manufacturing. The peer-to-peer interaction system 100 can comprise a plurality of peers 10_1 to 10_n, n is a natural number greater than 1.

In one embodiment, the plurality of peers 10_1 to 10_n can comprise a robot control server and a plurality of autonomous mobile robots (AMRs). Information can be shared directly between the plurality of peers 10_1 to 10_n.

In one embodiment, the peer-to-peer interaction system 100 can further comprise a plurality of artifacts 20. Each of the artifacts 20 can comprise a device or a component offering a specific operation or function. Each of the artifacts 20 can be an operation device, a configuration device, or a planning device, etc. The operation device can comprise a sensor, a programmable logic controller, or an actuator, etc. The configuration device can comprise a human-computer interface, or a display screen, etc. The planning device can supply operation planning commands to a peer, planning devices can comprise a manufacturing execution system (MES), a warehouse management system (WMS), and an enterprise resource planning (ERP) system, etc. Each of the plurality of peers 10_1 to 10_n can obtain first specific data from one of the artifacts 20 or transmit second specific data to one of the artifacts 20.

Figure 2:
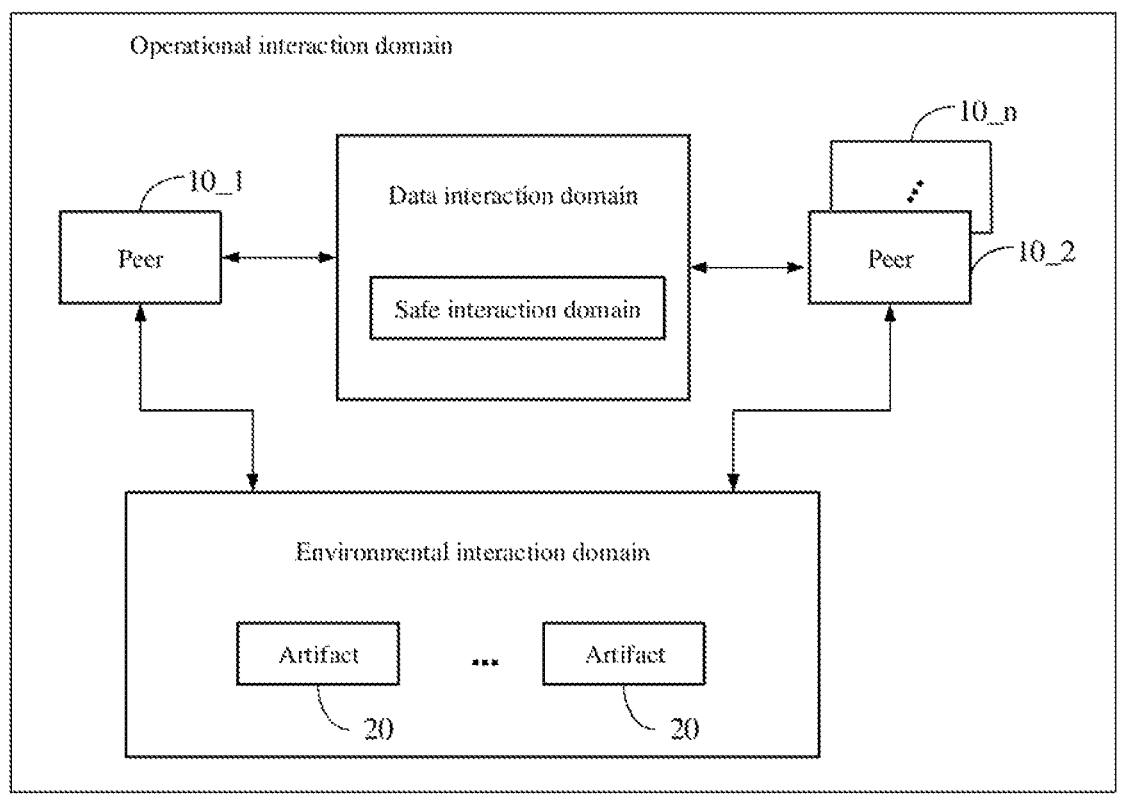
FIG. 2 is a diagram of an embodiment of the system involving four interaction domains.

In one embodiment, referring to FIG. 2, the peer-to-peer interaction system 100 can involve four interaction domains to achieve efficient operation in an automated industrial environment. The four interaction domains can comprise a data interaction domain, an operation interaction domain, an environmental interaction domain, and a safety interaction domain. The data interaction domain can involve data management operations related with information exchange, request, supply, and storage. The data interaction domain can involve the exchange of information between the plurality of peers 10_1 to 10_n. The operation interaction domain can involve management of operation-oriented resources. Resources can be obtained from artifact or virtual artifact. The environmental interaction domain can involve physical elements, whether networked devices or otherwise. It means that the interaction of peers, artifacts and disconnected elements which may be lacking networking/communication capabilities either permanently or temporarily (not shown in FIG. 2 but will be explained in details in FIG. 5) can be managed in the environmental interaction domain. The safety interaction domain can involve operational safety without compromising a system performance.

Figure 3A:
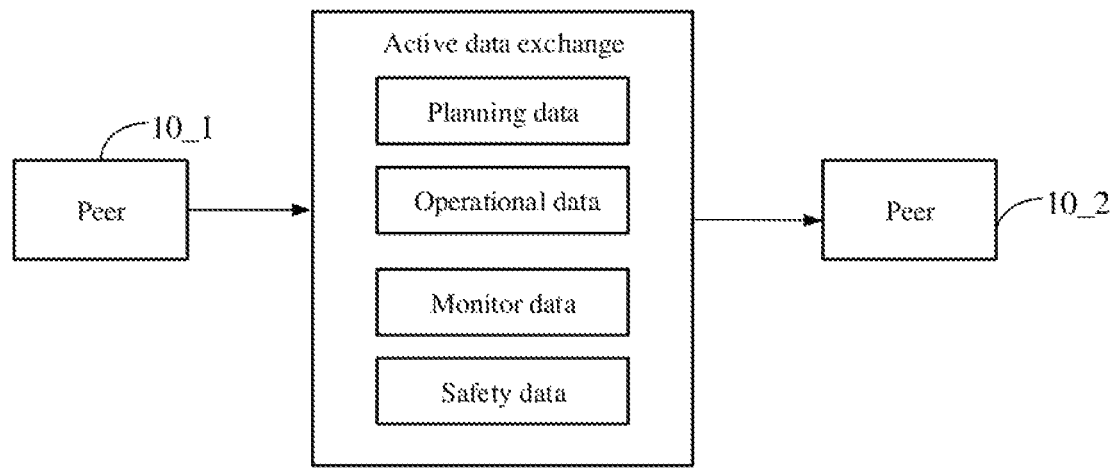
FIGS. 3a and 3b show an embodiment of data interaction domain between two peers of the system of FIG. 1.
Figure 3B:
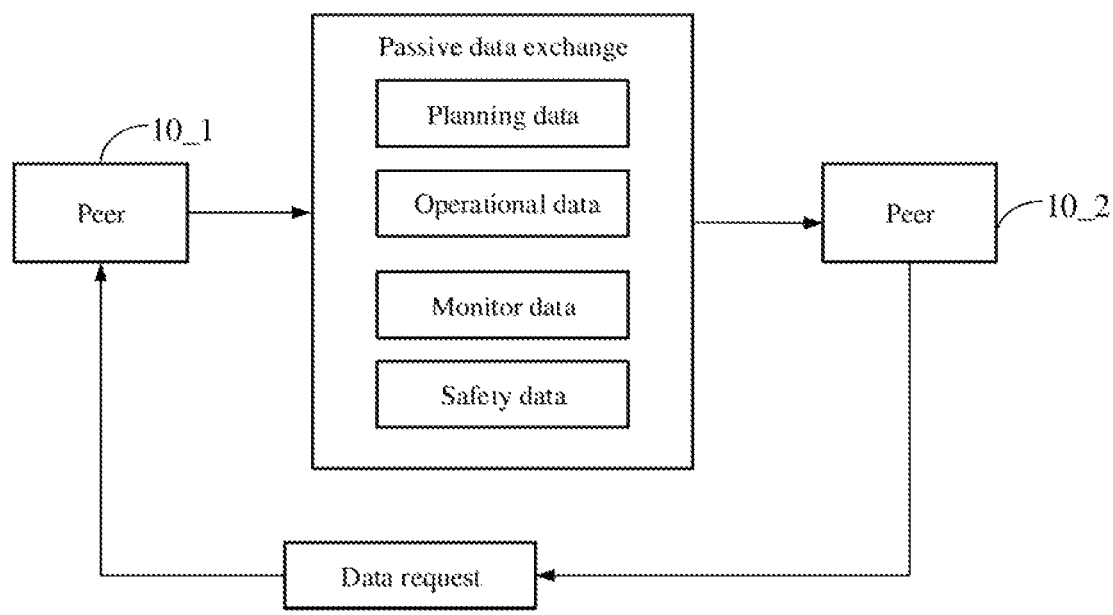

In one embodiment, referring to FIGS. 3a and 3b, a first peer 10_1 of the plurality of peers 10_1 to 10_n can exchange data with a second peer 10_2 of the plurality of peers 10_1 to 10_n. The data can comprise at least one selected from a group consisting of planning data, operational data, monitor data, and safety data.

In one embodiment, the planning data can be shared or requested by one peer to enable decisions in planning. The planning data can involve distributed consensus. The operational data can be shared or requested by one peer to enable factory operation. The monitor data can be shared or requested by one peer to supply or parameterize status and configuration information. The safety data can be shared or requested by one peer to provide safety operation mechanism or to ensure operational safety.

In one embodiment, since even failure or abnormal situations cannot be completely avoided in the automated industrial environment, a safe operation is a critical and should be ensured at all times. An interaction priority of the safety data is greater than interaction priorities of the planning data, the operational data, and the monitor data, and/or a response priority of the safety data is greater than response priorities of the planning data, the operational data, and the monitor data.

For example, the planning data is exchanged with organizational systems or software, and can compose information related with the manufacturing execution, warehouse request, or resources planning. The operational data can comprise information related with task execution, task perception, or task consensus, etc. The monitor data can comprise information, such as peer status, task progress, environment status, or factory status, configuration parameters, etc.

In one embodiment, the data can be exchanged actively or passively. The data can be actively shared by one peer independently of being requested by another peer or not. An active data exchange can happen periodically, or be event based. A passive data exchange requires another peer to request specific information to trigger the data exchange. For example, in FIG. 3a, the first peer 10_1 actively exchanges data with the second peer 10_2. In FIG. 3b, the first peer 10_1 can exchanges data with the second peer 10_2 when the first peer 10_1 receives an interaction request from the second peer 10_2.

In one embodiment, the robot control server can be defined as a peer core and the AMR can be defined as a peer agent. For example, the peer core request a production plan (planning data) from the MES (artifact). The peer core assigns an operation task (operation data) to a peer agent. The peer agent periodically exchanges robot status (monitor data) with one or more of the other peers.

Figure 4A:
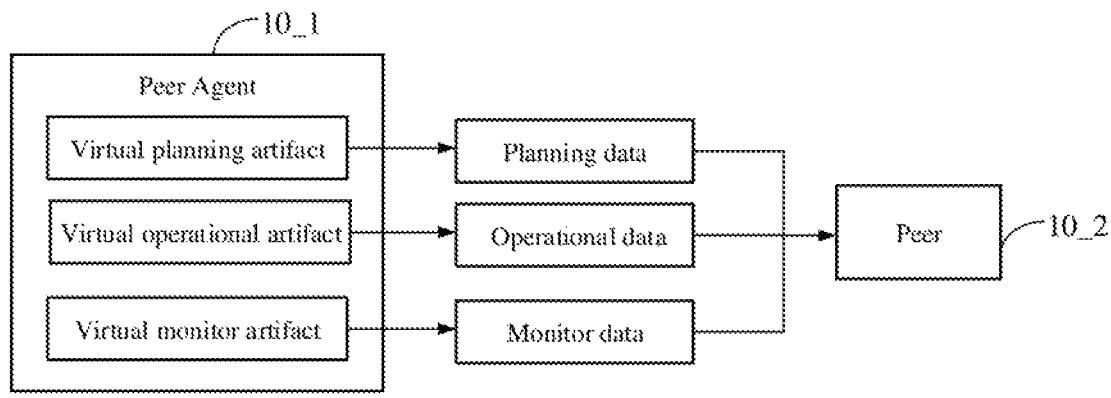
FIGS. 4a and 4b show an embodiment of operation interaction domain between two peers of the system of FIG. 1.
Figure 4B:
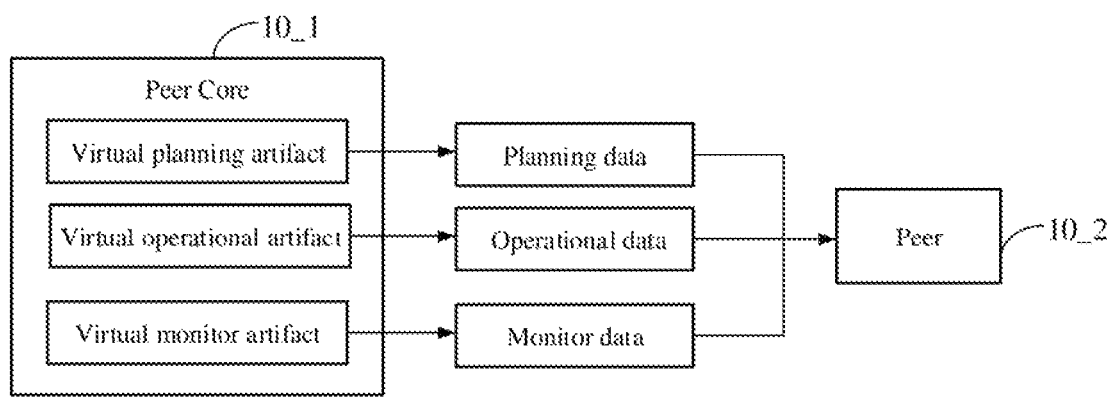

Referring to FIGS. 4a and 4b, in an interaction between two peers, one of the two peers can be virtually interacted as an artifact by the other one. This is possible because of peers are capable of complex computation and operation, while artifacts offer a narrow specific operation, and can reduce complexity of operation. When the first peer 10_1 transmits the data to the second peer 10_2, the first peer 10_1 can be regarded as interacting as a virtual artifact. The first peer 10_1 can interact as a virtual planning artifact, a virtual operational artifact, or a virtual monitor artifact depending on whether the planning data, the operation data, or the monitor data is exchanged.

In one embodiment, when the first peer 10_1 transmits the planning data to the second peer 10_2, the first peer 10_1 is interacting as the virtual planning artifact. When the first peer 10_1 transmits the operational data to the second peer 10_2, the first peer 10_1 is interacting as the virtual operational artifact. When the first peer 10_1 transmits the monitor data to the second peer 10_2, the first peer 10_1 is interacting as the virtual monitor artifact.

In one embodiment, the first peer 10_1 can be the peer core (as shown in FIG. 4b) or the peer agent (as shown in FIG. 4a). The peer agent can interact as the virtual monitor artifact to exchange room's dynamic obstacles data (monitor data) with one of the rest of peers. The peer core can interact as the virtual planning artifact to exchange the production plan task schedule (planning data) with the peer agent.

In one embodiment, virtual artifacts (virtual planning artifact, virtual operational artifact, and virtual monitor artifact) are created to reduce the complexity of operation in the automated industrial environment. The interaction between the plurality of peers 10_1 to 10_n can involve many different types of data. Some of these types of data are not relevant for certain kind of interaction. Therefore, instead of dealing with the peer agent or the peer core as a complex device, it is handled as a virtual artifact of the required type.

In one embodiment, the more detailed the environmental information becomes, the more efficiently the industrial automation will operate. The environmental information is usually gathered, stored, and managed in a centralized server, that distributes the environmental information to the remaining peers. Nevertheless, different environmental elements may lack networking/communication capabilities either permanently or temporarily.

Figure 5:
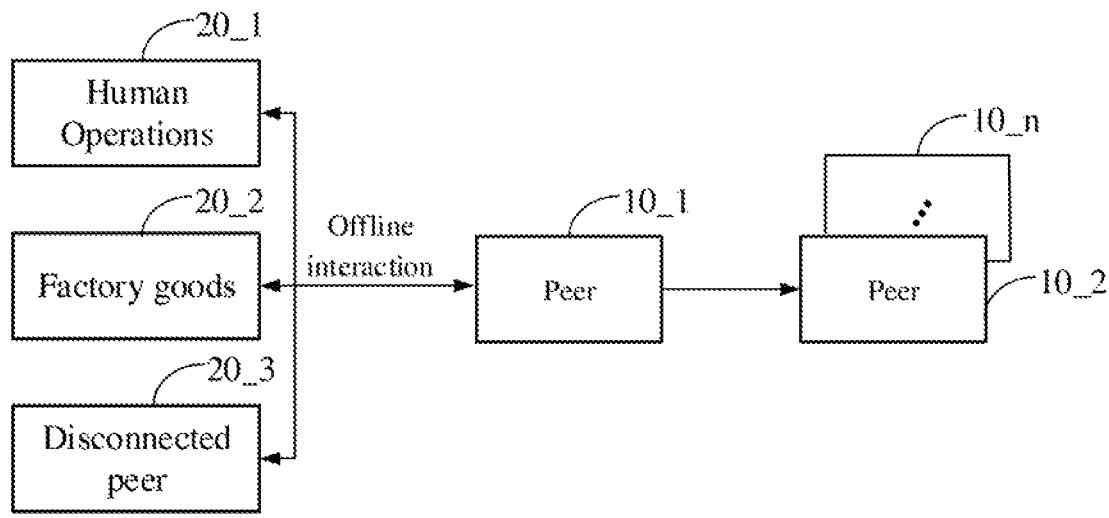
FIG. 5 shows an embodiment of environmental interaction domain among two or more peers and environmental elements.

Referring to FIG. 5, each of the peers 10_1 to 10_n can perform offline interaction with an environmental element which is lacking a network capability. The first peer 10_1 can obtain offline interaction data with respect to the environmental element, and share the offline interaction data to the rest of peers. For example, the first peer 10_1 can share the offline interaction data to the second peer 10_2.

In one embodiment, the first peer 10_1 can actively or passively obtain offline interaction data with respect to the environmental element. For example, the first peer 10_1 actively detects a status of the environmental element to obtain the offline interaction data with respect to the environmental element. The first peer passively receives the offline interaction data with respect to the environmental element through an intermediate component, such as a human-computer interface, through its own perception capabilities, or through other methods.

In one embodiment, the environmental elements comprise but are not limited to human operators 20_1, factory goods 20_2, or disconnected peers 20_3, etc. In the automated industrial environment, when a presence of operators is allowed, a degree of interaction between the human operators 20_1 and the peers 10_1 to 10_n need to be managed. Human interaction can be related with the operational data or the monitor data depending on the offline interaction. The factory goods 20_2 can be goods or items involved in the process needing to be handled. The factory goods 20_2 can be related with the operational data or the monitor data depending on the offline interaction. The disconnected peers 20_3 are peers which are unable to exchange their own data (network errors or malfunction), the disconnected peers 20_3 can be related with the operational data or the monitor data through interaction with networked peers.

For example, one AMR (a connected peer) can detect the factory goods 20_2 (monitor data) stored on a warehouse rack (offline interaction) and exchange detected information with the rest of peers. One AMR (a connected peer) can receive an interaction command (operational data) from a human operator through an on-board button or a touch panel (offline interaction) installed on the AMR. One AMR (a connected peer) can detect a faulty AMR (a disconnected peer) blocking a pathway or road and raise a warning about the pathway or the road being blocked (safety data).

In one embodiment, each of the plurality of peers 10_1 to 10_n should always have access to network to transmit the data. The offline interaction can be an interaction process between the human operator and the AMR. For example, supposing that the AMR (a connected peer) needs to go to a cargo area to pick some goods, when the AMR reaches the cargo position, the AMR waits for a human operator to put the cargo on the AMR. When the cargo is ready, the AMR can move to a designated place. The AMR can share updates on the status of the warehouse (operational data) to reflect that the cargo that has been picked, change the status of the current task (operational data) to acknowledge that the cargo has been picked, and change its own status (monitor data) to reflect that the AMR is loaded with the cargo.

Figure 6:
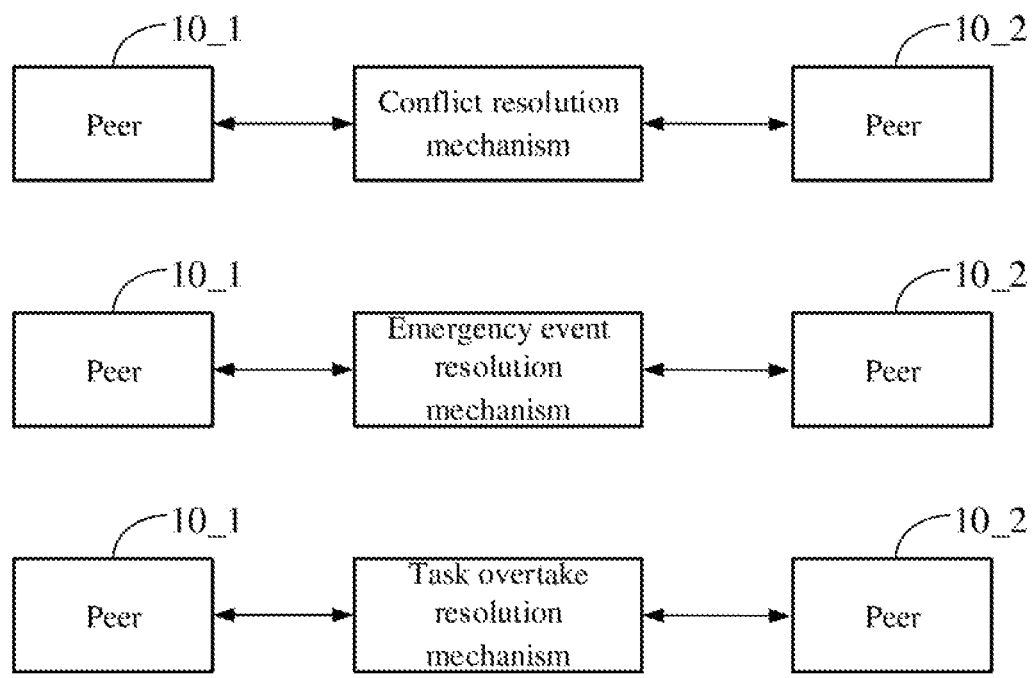
FIG. 6 shows an embodiment of safety interaction domain between or more two peers of the system of FIG. 1.

Referring to FIG. 6, the safety data can comprise at least one selected from a group consisting of a conflict resolution mechanism, an emergency event resolution mechanism, and a task overtake resolution mechanism.

In one embodiment, the first peer 10_1 and the second peer 10_2 can reach a consensus of the conflict resolution mechanism based on an exchanging of the operational data, for example, the first peer 10_1 and the second peer 10_2 are two AMRs, the two AMRs (connected peers) meet each other on the same pathway but in opposite directions, the two AMRs will decide which one goes to the left and which one goes to the right in order to avoid a frontal collision through an exchange of navigation information (operational data) and consensus.

In one embodiment, the first peer 10_1 and the second peer 10_2 can reach a consensus of the event resolution mechanism based on an exchanging of the planning data. For example, one AMR (a connected peer) has failed to reach a destination position because a pathway is blocked with some cargo, AMR will request another AMR (a connected peer) to go to the destination position knowing which pathway is newly blocked pathway (task overtake). As a result, additional peers can overtake the failed tasks or execute safe operation actions to guarantee the overall safety and get the job done.

In one embodiment, the first peer 10_1 and the second peer 10_2 can reach a consensus of the task overtake resolution mechanism based on an exchanging of the monitor data. One peer can share events related with emergency status through the exchange of the monitor data with the rest of peers. For example, one AMR (a peer agent) can communicate to one robot control server (a core peer) that it is running out of battery power (emergency event), as a result, the task schedule of the robot control server will adapt to this condition.

Figure 7:
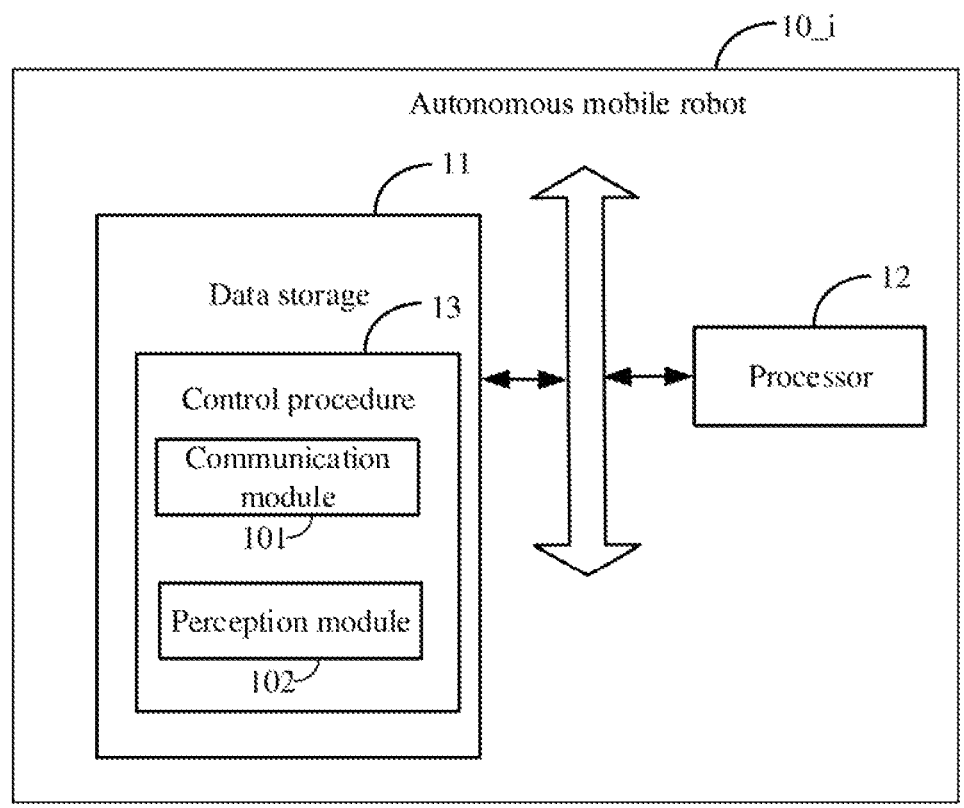
FIG. 7 is a block diagram of an embodiment of an autonomous mobile robot of the system of FIG. 1.

FIG. 7 illustrates a peer 10_i (i∈1, 2, ..., n) in accordance with an exemplary embodiment. The peer 10_i is an AMR. The AMR can comprise a data storage 11, a processor 12, and a control procedure 13.

In one embodiment, the data storage 11 can be in the AMR, or can be a separate external memory card, such as an SM card (Smart Media Card), an SD card (Secure Digital Memory Card), or the like. The data storage 11 can include various types of non-transitory computer-readable storage mediums. For example, the data storage 11 can be an internal storage system, such as a flash memory, a random access memory (RAM) for temporary storage of information, and/or a read-only memory (ROM) for permanent storage of information. The data storage 11 can also be an external storage system, such as a hard disk, a storage card, or a data storage medium. The processor 12 can be a central processing unit (CPU), a microprocessor, or other data processor chip that performs functions of the AMR.

The control procedure 13 arises from a plurality of modules, such as a communication module 101 and a perception module 102. The modules 101-102 may comprise one or more software programs in the form of computerized codes stored in the data storage 11. The computerized codes may include commands that can be executed by the processor 12 to provide functions for the modules 101-102.

The communication module 101 exchanges data with another peer. The data can comprise at least one selected from a group consisting of planning data, operational data, monitor data, and safety data. The another peer can comprise a robot control server or another AMR.

In one embodiment, the communication module 101 can actively or passively exchange the data with the another peer.

The perception module 102 obtains offline interaction data with respect to an environmental element which is lacking a network capability and shares the offline interaction data to the another peer.

In one embodiment, the perception module 102 can actively or passively obtain the offline interaction data with respect to the environmental element. For example, the peer 10_i actively detects a status of the environmental element to obtain the offline interaction data with respect to the environmental element. The peer 10_i passively receives the offline interaction data with respect to the environmental element through an intermediate component, such as a human machine interface, through its own perception capabilities, or through other methods.

In one embodiment, the environmental elements comprise but are not limited to human operators 20_1, factory goods 20_2, or disconnected peers 20_3, etc.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A peer-to-peer interaction management system comprising a plurality of peers and a plurality of artifacts, the plurality of peers comprising a robot control server and a plurality of autonomous mobile robots, each of the plurality of artifacts comprising a device or a component offering only a specific operation or a specific function, wherein, a first peer of the plurality of peers exchanges data with a second peer of the plurality of peers, the data is selected from a group consisting of planning data, operational data, monitor data, and safety data;

when the first peer transmits the data to the second peer, the first peer is interacted as a virtual artifact;

when the first peer transmits the planning data to the second peer, the first peer is interacted as a virtual planning artifact; when the first peer transmits the operational data to the second peer, the first peer is interacted as a virtual operational artifact; and when the first peer transmits the monitor data to the second peer, the first peer is interacted as a virtual monitor artifact.

2. The peer-to-peer interaction management system of claim 1, wherein an interaction priority of the safety data is greater than interaction priorities of the planning data, the operational data, and the monitor data, or a response priority of the safety data is greater than response priorities of the planning data, the operational data, and the monitor data.

3. The peer-to-peer interaction management system of claim 1, wherein the first peer actively exchanges the data with the second peer.

4. The peer-to-peer interaction management system of claim 1, wherein the first peer exchanges the data with the second peer when the first peer receives an interaction request from the second peer.

5. The peer-to-peer interaction management system of claim 1, further comprising a plurality of artifacts, wherein each of the artifacts comprises a device or a component offering a specific operation, each of the plurality of peers obtains first specific data from one of the artifacts or transmits second specific data to one of the artifacts.

6. The peer-to-peer interaction management system of claim 1, wherein the first peer obtains offline interaction data with respect to an environmental element which lacks a network capability, and shares the offline interaction data to the rest of peers.

7. The peer-to-peer interaction management system of claim 6, wherein the first peer actively detects a status of the environmental element to obtain the offline interaction data with respect to the environmental element.

8. The peer-to-peer interaction management system of claim 6, wherein the first peer passively receives the offline interaction data with respect to the environmental element through an intermediate component.

9. The peer-to-peer interaction management system of claim 1, wherein the safety data is selected from a group consisting of a conflict resolution mechanism, an emergency event resolution mechanism, and a task overtake resolution mechanism.

10. The peer-to-peer interaction management system of claim 9, wherein the first peer and the second peer reach a consensus of the conflict resolution mechanism based on an exchanging of the operational data, reach a consensus of the emergency event resolution mechanism based on an exchanging of the monitor data, and reach a consensus of the task overtake resolution mechanism based on an exchanging of the planning data.

11. An autonomous mobile robot (AMR) comprising:
at least one processor; and
a data storage storing one or more programs which when executed by the at least one processor, cause the at least one processor to:
exchange data with a peer, wherein the data is selected from a group consisting of planning data, operational data, monitor data, and safety data, the peer comprises a robot control server or another AMR;
when the AMR transmits the data to the peer, the AMR is interacted as a virtual artifact, an artifact comprises a device or a component offering only a specific operation or a specific function;
when the AMR transmits the planning data to the peer, the AMR is interacted as a virtual planning artifact when the AMR transmits the operational data to the peer, the AMR is interacted as a virtual operational artifact and when the AMR transmits the monitor data to the peer, the AMR is interacted as a virtual monitor artifact.

12. The AMR of claim 11, wherein an interaction priority of the safety data is greater than interaction priorities of the planning data, the operational data, and the monitor data, or a response priority of the safety data is greater than response priorities of the planning data, the operational data, and the monitor data.

13. The AMR of claim 11, wherein the at least one processor to exchange data with the peer comprises:
exchange the data with the peer actively initiated by the AMR.

14. The AMR of claim 11, wherein the at least one processor to exchange data with the peer comprises:
exchange the data with the peer if the AMR receives an interaction request from the peer.

15. The AMR of claim 11, wherein the at least one processor is further configured to:
passively obtain offline interaction data with respect to an environmental element which lacks a network capability; and
share the offline interaction data to the peer.

16. The AMR of claim 15, wherein the at least one processor to obtain the offline interaction data with respect to the environmental element comprises:
actively detect a status of the environmental element to obtain the offline interaction data with respect to the environmental element; or
obtain the offline interaction data with respect to the environmental element through an intermediate component.

17. The AMR of claim 11, wherein the safety data is selected from a group consisting of a conflict resolution mechanism, an emergency event resolution mechanism, and a task overtake resolution mechanism.

18. The AMR of claim 17, wherein the AMR and the peer reach a consensus of the conflict resolution mechanism based on an exchanging of the operational data, reach a consensus of the emergency event resolution mechanism based on an exchanging of the monitor data, and reach a consensus of the task overtake resolution mechanism based on an exchanging of the planning data.

* * * * *